United States Patent [19]
Daigle

[11] 4,045,060
[45] Aug. 30, 1977

[54] PIPE RETAINER JOINTS

[75] Inventor: Rosaire Daigle, St. Lambert, Canada

[73] Assignee: Daigle Aqua Inc., Quebec, Canada

[21] Appl. No.: 648,046

[22] Filed: Jan. 12, 1976

[30] Foreign Application Priority Data

Dec. 4, 1975 Canada .................................. 241069

[51] Int. Cl.² ........................................... F16L 17/00
[52] U.S. Cl. ..................................... 285/369; 285/156;
285/179; 285/373
[58] Field of Search ............... 285/369, 373, 417, 419,
285/322, 179, 323, 243, 420, 424, 5, 156

[56] References Cited

U.S. PATENT DOCUMENTS

| 1,789,379 | 1/1931 | Dillon | 285/373 X |
| 2,531,401 | 11/1950 | Clerke | 285/322 |
| 3,645,563 | 2/1972 | Rochelle | 285/322 X |
| 3,727,951 | 4/1973 | Shire | 285/369 X |
| 3,754,781 | 8/1973 | Conroy | 285/322 |

FOREIGN PATENT DOCUMENTS

| 1,009,273 | 11/1965 | United Kingdom | 285/369 |
| 18,375 of | 1905 | United Kingdom | 285/417 |

*Primary Examiner*—Dave W. Arola
*Attorney, Agent, or Firm*—Larson, Taylor and Hinds

[57] ABSTRACT

A pipe retainer joint particularly for use in connecting lengths of plastic pipe to each other or for connecting plastic pipe to the branches of valves and pipe fittings.

The pipe retainer joint in one form of the invention has a central member in which the abutting ends of pipe are sealed by means of O-rings, and a pair of split end members, joined to the central member by cast lugs, hold the pipe against withdrawal from the central member when clamped about the pipes. In a modified form of the invention, the central member and the split end members are separate from each other with the central member having external annular grooves at each end thereof, and the end members have a split annular collar which are aligned with the annular grooves in the central member and seat in the annular grooves when the split end members are clamped about the pipes. In a still further modification, the pipe is joined to the branch of valves or pipe fittings where the pipe is fitted into the branch and is sealed therein by an O-ring, and a pipe retaining member, including a split annular collar, is clamped about the pipe and the annular collar is seated in an external groove in the branch of the valve or pipe fitting.

5 Claims, 8 Drawing Figures

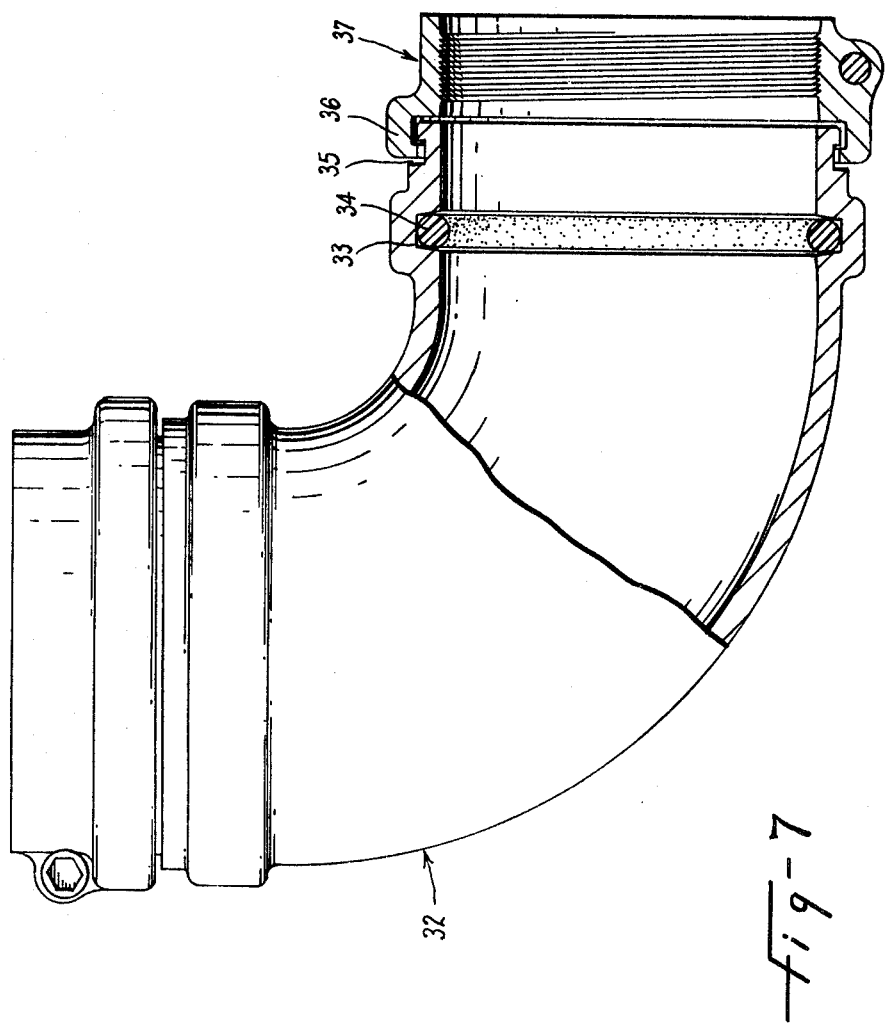

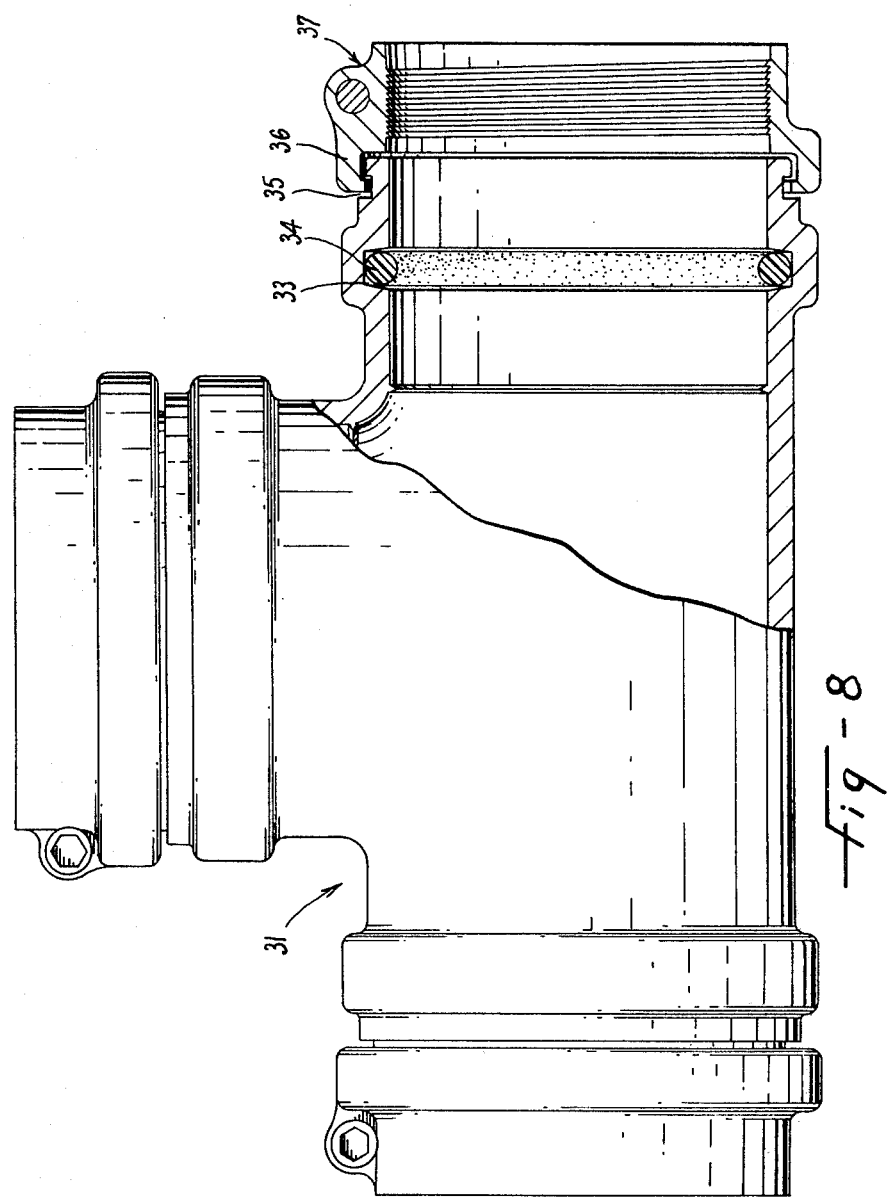

PIPE RETAINER JOINTS

This invention relates to pipe retainer joints and particularly to pipe retaining joints for use in municipal and industrial fluid systems and more particularly where such fluid systems make use of plastic pipe and the systems are located underground.

In the past where plastic pipe has been used in water systems, a serious problem has been encountered in providing an adequate joint between lengths of plastic pipe and between plastic pipe and pipe fittings, such as valves, T's and bends, which would prevent axial withdrawal of the pipes from the couplings and pipe fittings. It has also been a problem to uncouple an installed joint from plastic pipe which has developed leaks due to fractures, etc. for the purpose of replacing the pipe without causing fracture of the joining member which would prevent its re-use in the piping system.

Effectively, in the past where municipalities and industries wanted to equip their fluid systems with plastic pipe and fittings, such pipe and fittings had to be joined by means of a plastic solder solvent or by fusion of the mating ends of the pipe and fittings. Such means for joining the ends of pipe and fittings required lengthy and expensive operations which were not always satisfactory, particularly when the systems were installed underground and put under fluid pressure.

In the present invention, the above difficulties have been largely overcome by providing a cast member for joining lengths of plastic pipe which, in one form of the invention, has a central cylindrical portion and a pair of end split pipe retaining portions joined to the central portion by short connections which will allow for the opening and closing of the pipe retaining portions without fracture. The central cylindrical portion has a pair of O-rings for sealing the abutting ends of pipe within the central member, while the split pipe retaining portions have their inner surface machined to provide annular teeth or serrations which are capable of biting into the surface of the pipe when the split pipe retaining members are clamped about the pipe by means of clamp bolts. Such teeth or serrations can also prevent axial withdrawal of pipes which are of a more rigid material than plastic.

In a modified form of the invention, the central cylindrical portion and the split pipe retaning members are made separate from each other, with the pipe retaining members being provided with means for engaging in annular grooves located on the outer surface of the end portions of the central cylindrical member.

In the unitary form of the invention, the pipe retainer joint is preferably cast from an iron having a degree of ductility in order that the slit end pipe retaining portions can be opened and closed about the pipe a number of times without fracturing where it is necessary to replace pipe which has been damaged. In the modified form of the invention, the central cylindrical portion can be made of grey iron which is relatively cheap, while the split pipe retaining portions can be made of ductile iron which will withstand repeated opening and closing without fracturing.

Where the invention is applied to joining plastic pipe to valves and pipe fittings, the branches of the valves and fittings are designed to serve the same purpose as the end portions of the unitary member or to make use of the separate pipe retaining members mentioned above.

For some end uses, the pipe retaining joint members may be cast of a plastic material which can be machined and have the necessary ductility to permit the piep retaining portions to be clamped and unclamped more often than is possible where the joint is made of iron and also will not deteriorate to the extent that cast iron will when placed underground for any length of time. One such plastic product is "DELRIN" manufactured and sold by Dupont.

It is a primary object of the invention to provide a fluid-tight pipe retaining joint for use with plastic pipe.

A further object of the invention is to provide a fluid-tight pipe retaining joint which will resist withdrawal of the pipe from the coupling when a pipe system is under pressure.

A further object of the invention is to provide a pipe retaining joint having a central cylindrical member in which the abutting ends of pipe are sealed and a pair of end members which engage with the pipes to prevent their withdrawal from the central member.

A further object of the invention is to provide a pipe retaining joint having pipe clamping means which will resist fracture of the joining member under repeated use, as when the piping has to be replaced.

A further object of the invention is to provide a fluid-tight pipe retaining joint which can be used in straight line piping or in conjunction with a variety of pipe fittings such as T's, elbows, valves, etc.

A futher object of the invention is to provide a fluid-tight pipe retaining joint having a minimum of parts facilitating its use in tight locations such as in ground trenches.

These and other objects of the invention will be apparent from the following detailed specifications and the accompanying drawings in which:

FIG. 3 is an end view of the pipe retaining joint shown in FIGS. 1 and 2.

FIG. 7 is a part sectional view of the form of pipe retaining joint shown in FIG. 4, but applied to one branch of a valve.

FIG. 8 is an elevational view of a pipe retaining joint as shown in FIG. 4, but applied to a T pipe fitting.

Figure 1:
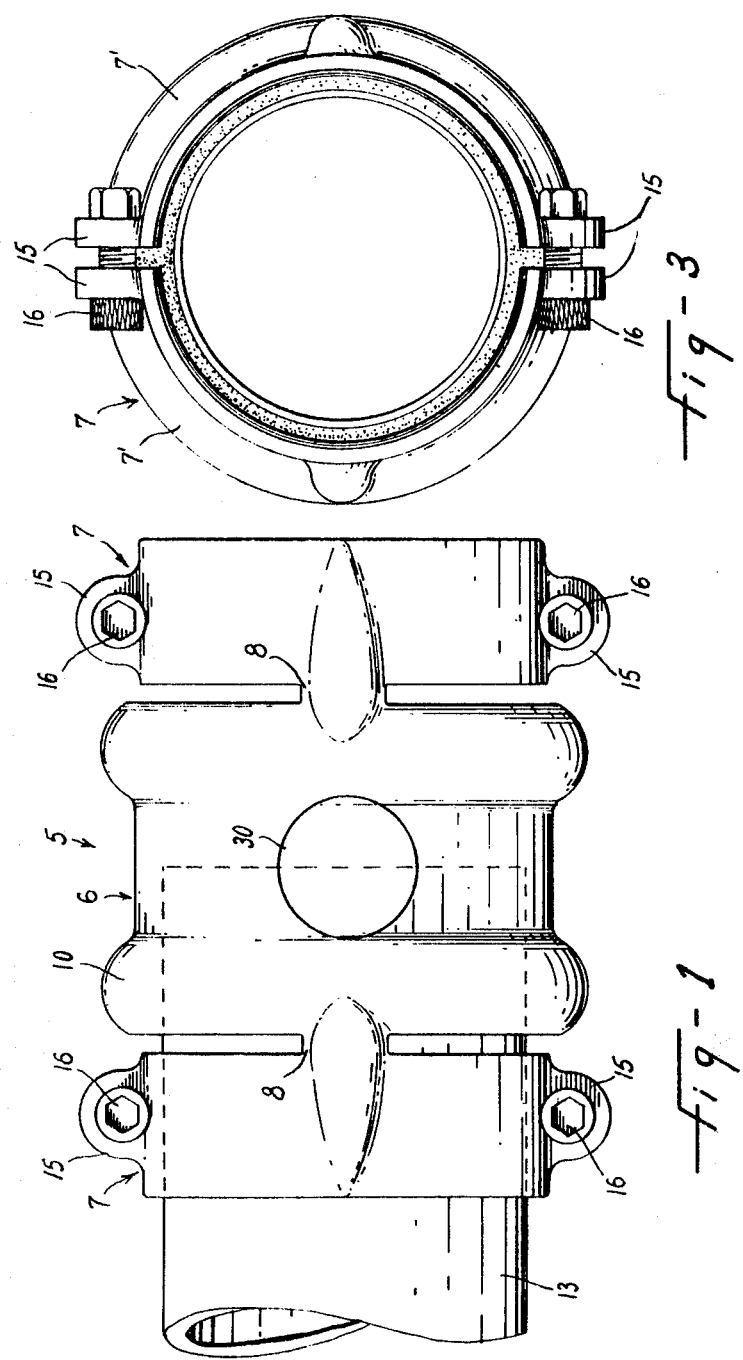
FIG. 1 is a side elevation of a unitary pipe retaining joint according to the present invention.
Figure 2:
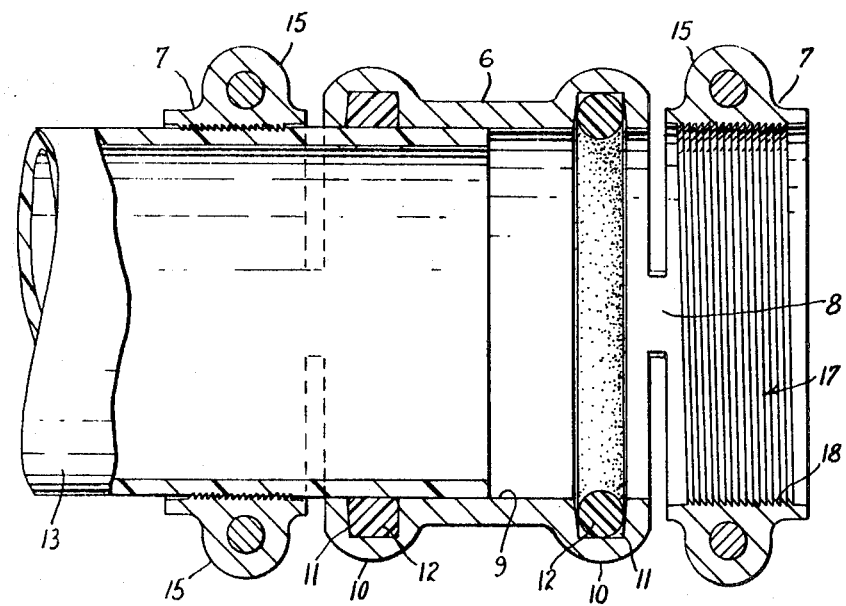
FIG. 2 is a longitudinal section of the pipe retaining joint shown in FIG. 1, and showing the abutting end portions of fluid carrying pipe sealed within the joint and secured to prevent withdrawal therefrom.

Referring to the drawings and particularly to FIGS. 1, 2 and 3, the pipe retaining joint 5 is formed of a unitary casting, including a cylindrical portion 6 and a pair of split end pipe retaining portions 7, each of which is joined to the central portion 6 is spaced axial relation thereto by a pair of bridging lugs 8 disposed diametrically opposite to each other. The design and dimension of the lugs 8 is such that they will be sufficiently strong to resist fracture when the pipe retaining portions 7 are clamped and unclamped repeatedly, as when a length of pipe has to be replaced without hampering the clamping operation.

The central cylindrical portion 6 of the joint has a smooth internal bore surface 9 and a pair of external end rings 10 allow for the machining of a pair of internal annular recesses 11 to accommodate O-rings 12 for sealing of abutting ends of pipes 13.

The pipe retaining joint 5 is cast preferably of iron which has sufficient ductibility to permit the pipe retaining portions 7 to be clamped about the pipe and loosened therefrom repeatedly without fracturing.

The pipe retaining portions 7 of the joint are preferably formed of two halves 7', each of which is held centrally to the central portion 6 of the joint by a lug 8 and the opposing ends of the two halves 7' terminate in bolt receiving lugs 15. The lugs 15 in one half 7' are spaced apart from the lugs 15 in the opposite half in order to allow the two halves 7' to be drawn together in clamping engagement with the pipes 13 by means of th clamp bolts 16.

The inner surfaces of the pipe retaining portions 7 are machined as shown at 17 which is here shown in the form of buttress threads 18, having their inward facing surface in a plane at right angles to the axis of the coupling to provide a maximum of retaining grip on the pipes 13 to prevent their withdrawal out of the joint.

Figure 5:
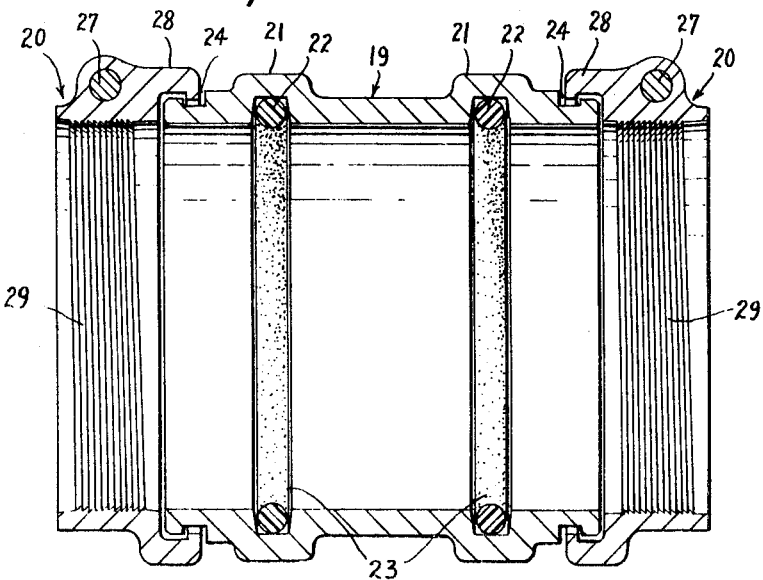
FIG. 5 is a longitudinal section of the pipe retaining joint shown in FIG. 4.
Figure 6:
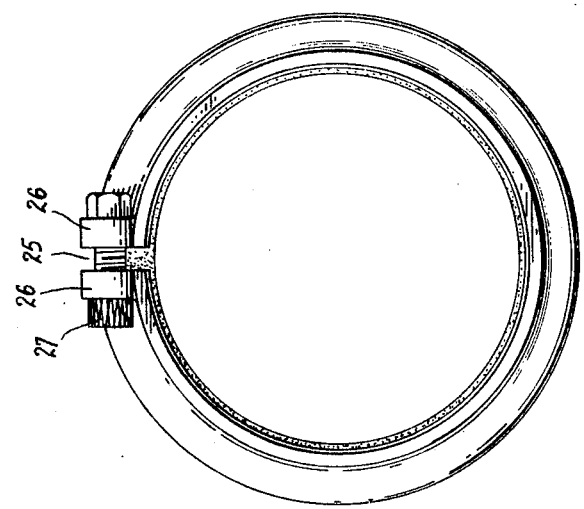
FIG. 6 is an end view of the pipe retaining joint shown in FIGS. 4 and 5.
Figure 4:
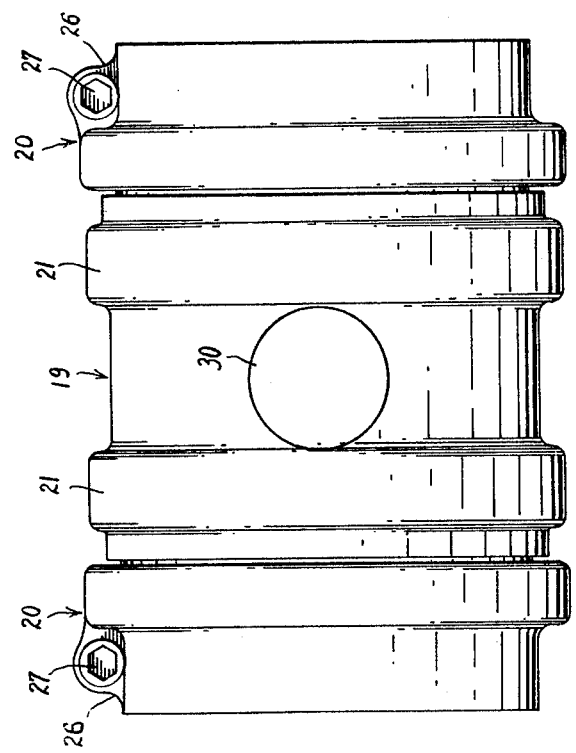
FIG. 4 is a side elevation of a modified form of the invention having separate end pipe retaining members in clamped engagement with a mid-pipe sealing member.

Referring now to the modification shown in FIGS. 4, 5 and 6, the central member 19 and the end pipe retaining memebers 20 are separate castings. The central member 19 can be cast of grey iron while the pipe retaining members 20 are preferably cast of ductile iron.

The central member 19 has a pair of external annular rings 21 to permit the machining of the internal annular recesses 22 to receive the O-rings 23 and has a smooth inner bore similar to the central portion of the joint shown in FIG. 2. The end portions of the central member 19 are each provided with an external annular recess 24.

The pipe retaining members 20 are each split at 25 and the opposing lugs 26 are drilled to receive the single clamp bolt 27.

Extending axially from one end of each of the split pipe retaining members 20 and in spaced relation therefrom is a split annular ring 28 adapted to engage in the annular recesses 24 of the central member 19. The inner diameter of the split annular rings 28 is such that when the pipe retaining members 20 are in their expanded position, the split annular rings 28 will slip over the outside surface of the end portions of the central member 18 and when the clamping bolt 27 is tightened, the rings 28 will seat in the recess 24.

The inner surface of the pipe retaining members 20 are machined at 29 in a manner similar to that shown at 17 in FIG. 2 to hole the pipes against withdrawal out of the central member 19 of the coupling.

In both forms of the invention, the central portion 6 of the form shown in FIGS. 1 to 3, and the central member 19 shown in FIGS. 4 to 6 may be provided with a boss 30 which can be drilled and tapped with the opening being cut through the pipes 13 where they abut each other between the pair of O-ring seals 12, to provide a take-off connection from the main pipe line.

In FIGS. 7 and 8, there is shown the adaptation of the invention to joining pipes to valves and pipe fittings 31 and 32. In this adaptation, the arrangement shown in FIGS. 4 to 6 is employed with the internal bores of the fittings having an internal annular recess 33 to receive an O-ring 34 and an external annular recess 35 to receive the split annular rings 36 extending from the pipe retaining members 37 and engaging in the annular recesses 35.

In the operation of this invention, as applied to the joining of lengths of plastic pipe as illustrated in FIGS. 1 to 6, the adjacent ends of piping to be joined are slipped through the opened pipe retaining members and into the central member and over the O-rings until the ends abut each other between the O-rings, with the O-rings providing the basic seal between the ends of the pipe.

In the form of the invention shown in FIGS, 1 to 3, two coupling bolts 16 are fitted in each of the pipe retaining members 7 and as the bolts 16 are tightened, the machined surfaces 17 bit into the outer surface of the pipes 13 sufficiently to grip the pipes and hold them against withdrawal out of the joint.

In the modified form of the invention shown in FIGS. 4 to 6, the central member 19 and the pipe retaning members 20 are separate castings, otherwise they are identical to the portion 6 shown in FIGS. 1 to 3. However, the separate members permit a great degree of flexibility in the joining of the pipes to each other. The pipe retaining members 20 can be fitted onto the adjacent ends of pipe to be coupled and the extended end of the pipes are then fitted into the central member 19 over the O-rings 23 to effect the basic seal of the pipes. The split annular rings 28 of the pipe retaining members 20 are then located over the annular recesses 24 in the central member 19 and are then clamped about the central member by single clamp bolts 27 to secure the joint between the pipes.

It should be noted that in one form of the invention, only two clamp bolts are required to secure the joint, while in the other form, one clamp bolt only is required. The minimal number of clamp bolts required to secure the joint is of great advantage where the piping is laid in trenches where the joint can be assembled in such a manner that it can be rotated to place the clamp bolts in a most advantageous position for ease of securing the joint in a confined space, and the only tool required in the installation of the joint is a wrench to tighten the bolts.

In FIGS. 7 and 8 where lengths of pipe are to be connected to valves or pipe fittings, the form of the invention detailed in FIGS. 4 to 6 is employed with the branches of the valves or pipe fittings being fitted with an O-ring seal and the pipe retaining member being engaged with the valve or pipe fitting branches in the manner previously described.

The embodiments of the invention in which an exclusive property or privilege is claimed are defined as follows:

1. A pipe retaning joint for joining lengths of pipe, comprising a unitary coupling member having a central cylindrical member and a pair of split pipe retaining end members, each end member being split at diametrically opposite points, the said end members being joined to the said central member by integral narrow lugs located midway between th splits in the end members and retaining the said central and end members in axial alignment, the said central member having a pair of axially spaced apart annular grooves on its inner surface and an O-ring seated in each of said annular grooves, the said split end members each having their internal surface grooved to form pipe gripping surfaces, and bolt means for contracting the said split end members to bring them into gripping engagement with the pipes to be joined and to hold the pipes against axial withdrawal from the central member of the pipe retaining joint.

2. A pipe retaining joint as set forth in claim 1 in which the said central cylindrical member has a pair of annular ridges on its external surface and the said annular grooves are located centrally therewith.

3. A pipe retaining joint as set forth in claim 1 in which the pipes to be joined are inserted through the said pipe retaining members and into the said central member and the O-rings therein, and into abuttment with each other centrally between the O-rings.

4. A pipe retaining joint as set forth in claim 1 in which the said bolt means for contracting the said end members include opposing pairs of lugs set diametrically opposite each other and at 90° from said bridging lugs, and bolts pass through the said pairs of lugs.

5. A pipe retaining joint as set forth in claim 1 in which the internal surface of the said pipe retaining members is formed of threads having a buttress form.

* * * * *